US007950471B2

(12) United States Patent
Loeffler et al.

(10) Patent No.: US 7,950,471 B2
(45) Date of Patent: May 31, 2011

(54) HAND-HELD POWER TOOL WITH PNEUMATIC PERCUSSION MECHANISM

(75) Inventors: Alexander Loeffler, Kaufering (DE); Reinhard Schulz, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 21 days.

(21) Appl. No.: 12/075,053

(22) Filed: Mar. 6, 2008

(65) Prior Publication Data

US 2008/0217040 A1 Sep. 11, 2008

(30) Foreign Application Priority Data

Mar. 7, 2007 (DE) ......................... 10 2007 000 131

(51) Int. Cl.
*B23B 45/16* (2006.01)

(52) U.S. Cl. ......... 173/210; 173/201; 173/128; 173/104

(58) Field of Classification Search .................. 173/210, 173/211, 201, 104, 128, 90, 200
See application file for complete search history.

(56) References Cited

U.S. PATENT DOCUMENTS

| | | | | |
|---|---|---|---|---|
| 2,308,143 | A * | 1/1943 | Amtsberg et al. | 173/211 |
| 2,533,487 | A * | 12/1950 | Maurer et al. | 173/170 |
| 2,685,274 | A * | 8/1954 | Liddicoat | 173/210 |
| 3,028,840 | A * | 4/1962 | Leaveil | 173/133 |
| 3,168,324 | A * | 2/1965 | Kennell | 173/137 |
| 3,179,185 | A * | 4/1965 | O'Farrell | 173/133 |
| 3,255,832 | A * | 6/1966 | Leavell | 173/133 |
| 4,113,035 | A * | 9/1978 | Stiltz et al. | 173/201 |
| 4,213,518 | A * | 7/1980 | von Hardenberg et al. | 188/380 |
| 4,362,216 | A * | 12/1982 | Jansz | 173/131 |
| 6,116,352 | A * | 9/2000 | Frauhammer et al. | 173/212 |
| 6,155,356 | A * | 12/2000 | Kikuchi et al. | 173/211 |
| 6,439,359 | B1 * | 8/2002 | Kato et al. | 188/379 |
| 6,644,418 | B2 * | 11/2003 | Haga | 173/48 |
| 6,675,908 | B1 * | 1/2004 | Frauhammer et al. | 173/48 |
| 6,948,571 | B2 * | 9/2005 | Hanke et al. | 173/201 |
| 2002/0072457 | A1 * | 6/2002 | Bschorr et al. | 492/3 |
| 2004/0194987 | A1 * | 10/2004 | Hanke et al. | 173/201 |
| 2004/0231869 | A1 * | 11/2004 | Bernhart et al. | 173/210 |
| 2006/0054333 | A1 * | 3/2006 | Duesselberg et al. | 173/201 |

* cited by examiner

*Primary Examiner* — Lindsay Low
(74) *Attorney, Agent, or Firm* — Abelman, Frayne & Schwab

(57) ABSTRACT

A hand-held power tool includes a percussion power tool includes a percussion piston (5) for applying blows to an anvil (8) axially displaceable in a guide tube (6) within limits defined by two, spaced from each other, stops (9*a*, 9*b*) arranged in the guide tube (6), a pneumatic percussion mechanism (2) for driving the percussion piston (5), an air spring (3) for connecting the percussion piston (5) with the percussion mechanism (2), and an impact ring (12) arranged coaxially with the anvil (8) outwardly thereof and having spaced from each other, inner radical flanks (14) located on opposite axial sides of the outer radial collar (11) provided on the anvil (8), with the impact ring (12) freely axially displaceable, within limits, relative to the outer radial collar (11) and having an outer diameter smaller than a guiding inner diameter of the guide tuber (6), and with a mass ratio of the impact ring (12) to the anvil (8) being equal at least 0.25.

7 Claims, 2 Drawing Sheets

HAND-HELD POWER TOOL WITH PNEUMATIC PERCUSSION MECHANISM

BACKGROUND OF THE INVENTION

1. Field of the Invention

The present invention relates to a hand-held percussion power tool with a pneumatic percussion mechanism, such as chisel hammer or hammer drill, and including a percussion piston displaceable in a guide tube and driven by an air spring and that applies blows to an axially displaceable, within certain limits, anvil that, in turn, applies blows to an end surface of a likewise axially movable, within certain limits, working tool.

2. Description of the Prior Art

At unusual operating conditions such as with idle blows applied in a direction of the working tool, with the working tool being lifted off a constructional component, and with reflected, acting in the opposite direction, rebound blows which occur upon striking a relatively rigid reinforcing metal, the percussion mechanism comes out of its optimal normal operational condition and generates strong vibrations which should be damped.

International Publication WO 03/024671 discloses a hand-held power tool having a pneumatic percussion mechanism and a damping member, with the percussion piston having an axially extending outer cone, which is formed by a tapering section, and which frictionally penetrates a steel ring of the damping member and thereby dissipates, at an idle blow, a major part of the displacement energy of the percussion piston over a long axial damping region in the viscoelastic damping member.

German Publication DE 3910398 discloses an arrangement of two anvils in an axially stationary three-part guide sleeve with an elastomeric damping ring. The guide sleeve is provided with two inner radial chamfers at its end sides which are repeatedly impacted by respective outer radial chamfers of an outer radial collar of an anvil at an idle blow, with resulting dissipation of the displacement energy of the percussion piston which is caused by an associated contact friction and the viscoelastic elastomeric damping ring.

According to European Publication EP 1238759, an anvil forms a second, axially spaced, outer radial collar that passes, at an idle blow, an elastomeric damping ring with an inner radial collar, viscoelastically widening the same, whereby additional displacement energy is damped.

According to German Publication De 44 00 779, an anvil is axially displaced in a slide sleeve which is elastically preloaded radially outwardly and frictionally slides in a guide tube. The slide sleeve has, at its opposite end sides, two inner radial chamfers, respectively, associated with respective outer radial chamfers of an outer radial collar formed on the anvil. During an idle blow, the working tool-side inner radial chamfer of the slide sleeve is radially widened, which increases the friction force of the slide sleeve so that, correspondingly, a greater amount of the displacement energy is dissipated. The remaining displacement energy is dissipated by a viscoelastic damping ring that the slide sleeve, together with the anvil, impacts.

The object of the present invention is to provide for robust, long-lasting means for damping idle blows.

Another object of the present invention is a hand-held percussion power tool in which the idle blow path of the anvil and, thereby, a constructional length of the power tool is reduced.

SUMMARY OF THE INVENTION

These and other objects of the present invention, which will become apparent hereinafter, are achieved by providing a hand-held percussion power tool, including a guide tube, an anvil axially displaceable in the guide tube within limits defined by two, spaced from each other, stops arranged in the guide tube, a percussion piston for applying blows to the anvil, a pneumatic percussion mechanism for driving the percussion piston, an air spring for connecting the percussion piston with the percussion mechanism, and an impact ring arranged coaxially with the anvil outwardly thereof and having spaced from each other, inner radial flanks located on opposite axial sides of an outer radial collar provided of the anvil, with the impact ring being freely axially displaceable, within limits, relative to the outer radial collar and having an outer diameter smaller than a guiding inner diameter of the guide tube, and with a mass ratio of the impact ring to the anvil being equal to at least 0.25.

A freely axially displaceable, within limits, relative to the anvil, impact ring, which is displaceable in the guide tube almost friction-free, forms, together with the anvil (during an idle blow), an impact system which, as a result of force pulses acting in an opposite, with respect to the direction of blow, direction, absorbs a portion of the displacement energy of the anvil and transfers it to the impact ring. This takes place because with a real (not ideally elastic) force pulse, as a result of contact and an inner material friction, constantly a portion of displacement energy dissipates. This takes place even when in an impact pair steel/steel with an impact parameter of about 0.95, this portion constitutes only 10% of the force pulse. In particular, during an idle blow, the anvil, which is displaceable with an anvil speed, applies, via the outer radial collar, a force pulse to the working tool-side inner radial flank of the impact ring that up to this moment, remained stationary (with respect to the power tool). As a result, the anvil brakes, and the impact ring accelerates until it itself impacts the power tool-side of the outer radial collar with its power tool-side, inner radial flank, transmitting its displacement energy to the anvil. In addition, upon contact of the anvil with an axial stop, a not unsubstantial energy loss takes place with a force pulse that results in reflection. This exchange continues over a number of force pulses until, with the energy transition (over time), the impact ring would have the same end speed as the anvil and, with it, as a result of energy losses, would come to rest to a most possible extent. For a successful idle blow damping, however, already braking of the anvil or a timely delay of its re-entry in the operational region of the percussion piston is suffice. Thus, the slow returning anvil reaches the front operational point of the advancing percussion piston with a delay, whereby the percussion mechanism cycle becomes broken, and the percussion piston reaches a working tool-side idle blow position that is offset with respect to the front operational point. In the idle blow position, the air spring is vented, and the percussion mechanism is practically switched off.

Advantageously, the impact ring is formed tangentially of two parts, advantageously of two shells which, during assembly, are fixedly connected with each other (e.g., are welded with each other, whereby the impact ring can be assembled around the outer radial collar of the anvil).

Advantageously, the tangentially formed two-part impact ring is surrounded radially outwardly with a circumferentially closed mounting sleeve that, advantageously, is resiliently preloaded radially inwardly and is provided with an inner thread. Thereby, a formlocking and frictional assembly of the tangentially formed two-part impact ring, which has an outer thread, with the mounting sleeve is possible.

Advantageously, an axial displacement path of the outer radial collar, which is displaceable axially, within limits, relative to the impact ring, has a length in a range between 1 mm and 5 mm, preferably, 2 mm. Thereby, during a stable percussion operation during which the percussion piston impacts the anvil at the front operational point, and the anvil, practically without any displacement, contacts an end surface of the axially movable, within limits, working tool, the anvil is only infinitesimally displaced within the axial displacement path of the collar. As a result, no force pulses are applied to the impact ring, and a loss-free stable operation takes place.

Advantageously, two, spaced from each other, annular stops are provided in the guide tube for the impact ring on its opposite sides. Advantageously, the power tool side annular stop is formed of a viscoelastic material. Thereby, the impact ring is directly bounces from the guide tube (without intermediation of the anvil) and dissipates energy.

Advantageously, an axial displacement path of the freely axially displaceable impact ring toward a respective annular stop in the guide tube, has a length in a range between 10 and 20 mm, preferably, 15 mm. Thereby, on one hand, at an idle blow, a more energy-dissipating reflections of the impact ring relative to the anvil takes place before the impact ring itself contacts or strikes a respective annular stop. On the other hand, the idle blow path of the anvil is smaller then at a comparable design but without the impact ring.

Advantageously, the outer radial collar is formed on a power tool-side, radially reduced, axial neck of the anvil. Thereby, the outer diameter of the outer radial collar and, thus, that of the impact ring are smaller (then with an anvil without an axial length). Thereby, the space, which is associated with idle flow damping, is reduced.

Advantageously, the axial impact surfaces provided on the outer radial collar and counterimpact surfaces provided on both inner radial flanks of the impact ring are provided with radial chamfers having the same chamfer angle. Advantageously, the chamfer angle lies in a range between 30° and 80°. Thereby, at an axial impact applied to the axial, a radial widening of the impact ring takes place, which as a result of microfriction associated with the widening of the impact ring, leads to conversion of a substantial portion of the impact energy into ring oscillations and heat.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
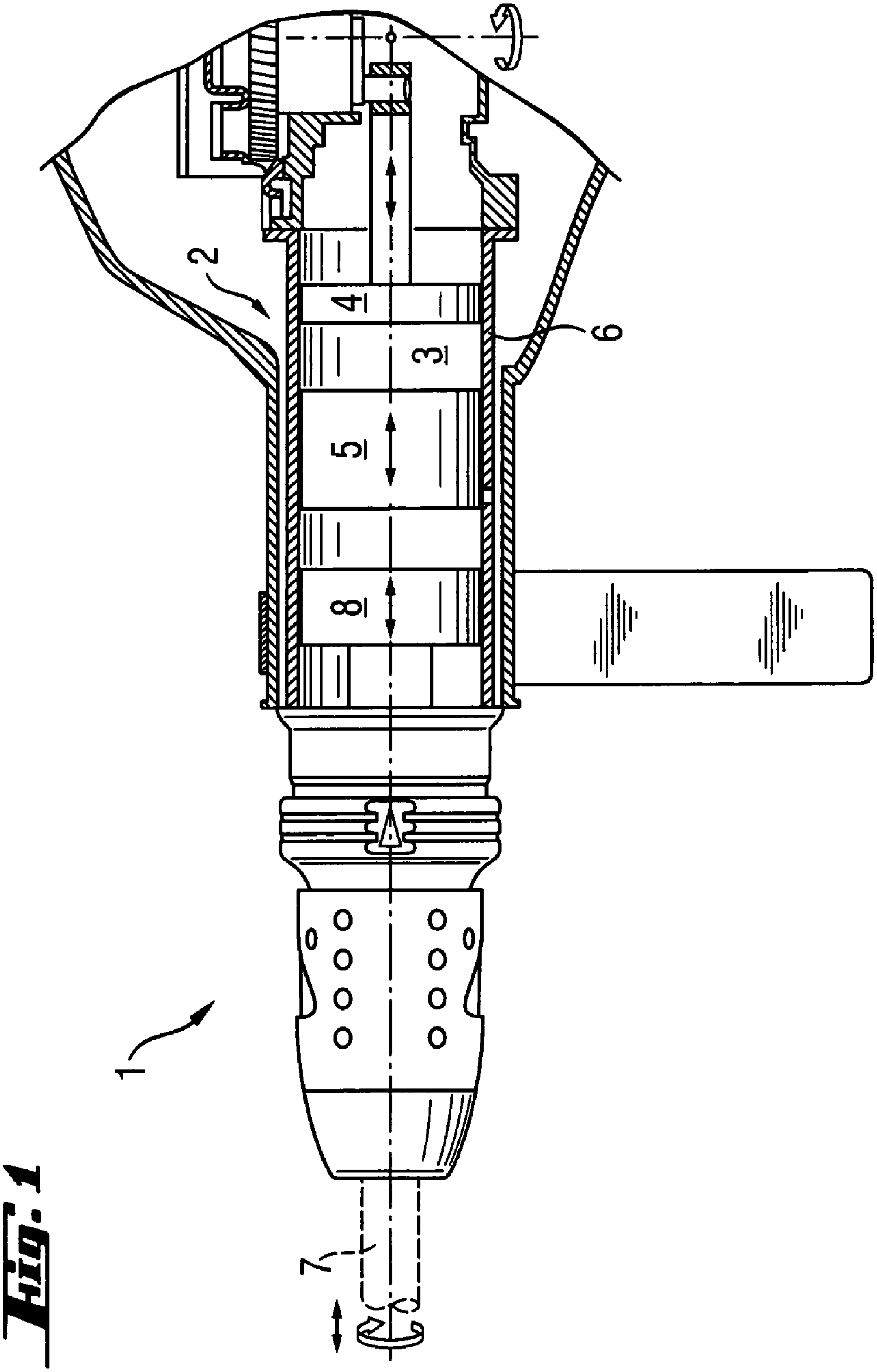
FIG. 1 a side partially cross-sectional view of a hand-held power tool according to the present invention.

A hand-held rotary-percussion power tool 1 for driving a working tool 7 and which is shown in FIG. 1, includes a pneumatic percussion mechanism 2 having a driving piston 4, a percussion piston 5 for applying blows to an anvil 8 displaceable in guide tube 6, and an air spring 3 that connects the percussion piston 5 with the driving piston 4.

Figure 2:
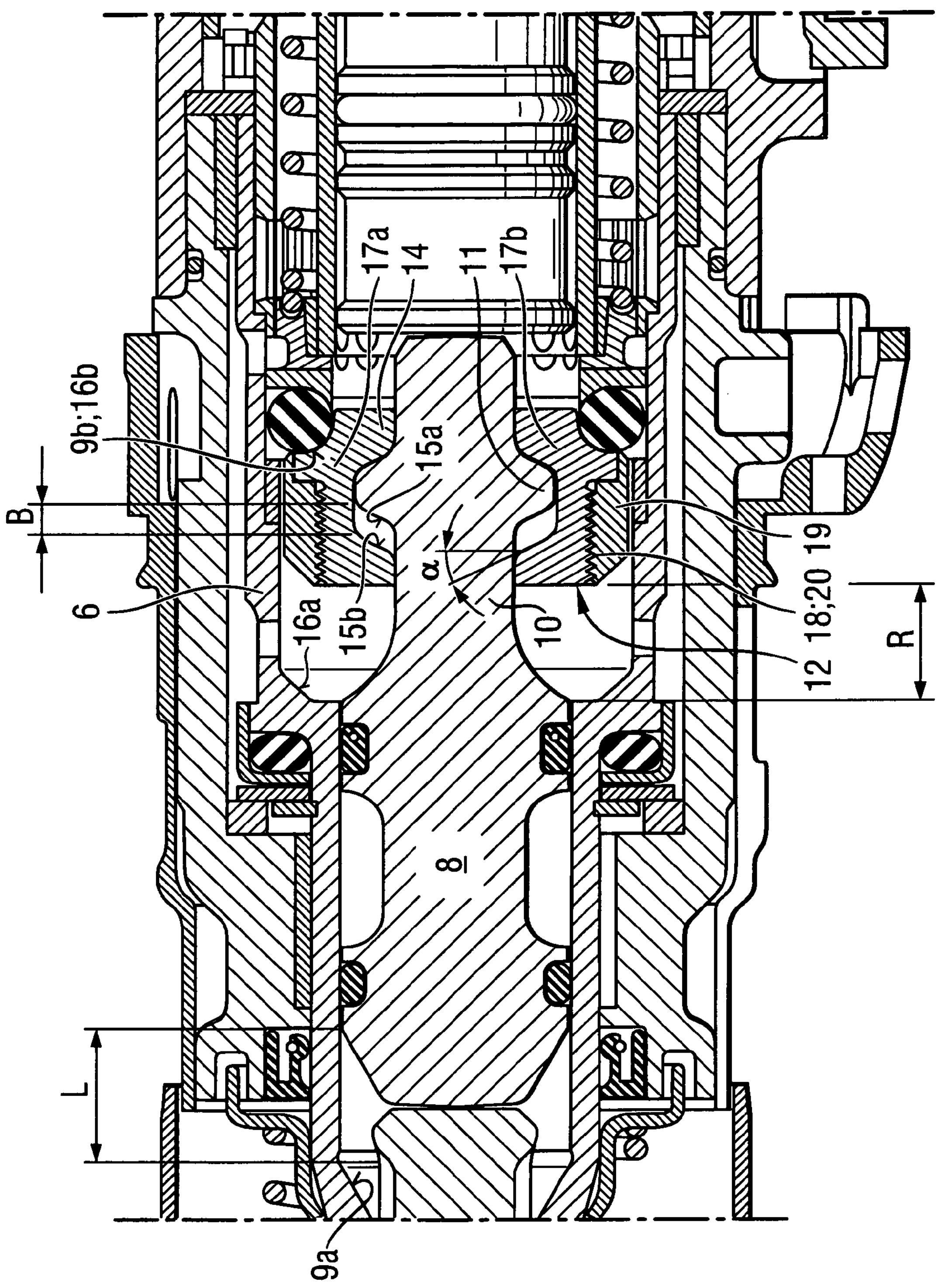
FIG. 2 a cross-sectional view of a section of the power tool shown in FIG. 1 at an increased, comparative to FIG. 1, scale.

As shown in FIG. 2, an axial free movement of the anvil 8 is limited by axial stops 9*a* and 9*b* arranged in the guide tube 6. The anvil 8 forms, on its power tool side, radially reduced, axial neck 10, an outer radial collar 11 axially displaceable within limits which are defined by inner radial flanks 14 of an impact ring 12 and which are located on opposite sides of the collar 11. The impact ring 12 is arranged coaxially with the collar 11. The mass ratio of the impact ring 12 to the anvil 8 amounts to exactly 0.25. Axial impact surfaces 15*a* which are provided on the collar 11, and counterimpact surfaces 15*b* which are provided on both inner radial flanks 14 of the impact ring 12, are provided with radial chamfers having the same radial chamfer angle (α) of 30°. In the guide tube 6, there are further provided two annular stops 16*a*, 16*b* for the impact ring 12. The power tool side, annular stop 16*b*, coincides with the power tool side axial stop 9*b* and is formed of viscoelastic material. The impact ring 12, is formed tangentially of two half-shells 17*a*, 17*b* provided with an outer thread 18. During assembly of the power tool, the two half-shells 17*a* and 17*b* are placed around the outer radial collar 11 and are surrounded by a circumferentially closed mounting sleeve 19 which is elastically preloaded radially inwardly and is provided with an inner thread 20. The outer diameter of the impact ring 12 (including the mounting sleeve 19) is somewhat smaller than the inner diameter of the guide tube 6 (being practically displaceable therein friction-free). The axially limited, free displacement path B of the outer radial collar 11 toward the impact ring 12 has an axial length of 2 mm. The axial length R of the free displacement path of the impact ring 12, which is measured between the annular stops 16*a*, 16*b* in the guide tube 6, amounts to 15 mm. The idle impact path L of the anvil 8 between the axial stops 9*a*, 9*b* amounts to 18 mm.

Though the present invention was shown and described with references to the preferred embodiment, such is merely illustrative of the present invention and is not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A hand-held percussion power tool, comprising a guide tube (6); an anvil (8) axially displaceable in the guide tube (6) within limits defined by two, spaced from each other, stops (9*a*, 9*b*) arranged in the guide tube (6), the anvil (8) having an outer radial collar (11); a percussion piston (5) for applying blows to the anvil (8); a pneumatic percussion mechanism (2) for driving the percussion piston (5); an air spring (3) for connecting the percussion piston (5) with the percussion mechanism (2); an impact ring (12) arranged in the guide tube (6) coaxially with the anvil (8) radially outwardly thereof, the impact ring (12) having an outer diameter smaller than a guiding inner diameter of the guide tube (6) and being freely displaceable, within limits, in the guide tube (6) relative to the anvil (8) for reducing an impact energy applied to the anvil during an idle blow applied to the anvil, wherein the impact ring (12) is formed of two parts, an inner ring formed of two half-shells [17*a*, 17*b*] and a radially outer, circumferentially closed, mounting sleeve (19) surrounding the inner ring for securely holding the half-shells [17*a*, 17*b*] together, and wherein the half-shells each has an outer thread (10), and the mounting sleeve (19) has an inner thread (20) cooperating with the outer thread (18) of the half-shells.

2. A hand-held power tool according to claim 1, wherein an axial displacement path of the outer radial collar (11), which is displaceable axially, within limits, relative to the impact ring (12), has a length (B) in a range between 1 and 5 mm.

3. A hand-held power tool according to claim 1, wherein two, spaced from each other, annular stops (16*a*, 16*b*) are provided in the guide tube (6) for the impact ring (12) on opposite sides thereof.

4. A hand-held power tool according to claim 3, wherein axial displacement path of the freely axially displaceable impact ring (12) toward a respective annular stop (16*a*, 16*b*) in the guide tube (6), has a length in a range between 10 and 20 mm.

5. A hand-held power tool according to claim 1, wherein the outer radial collar (11) is formed on a power tool side, radially reduced, axial neck (10) of the anvil (8).

6. A hand-held power tool according to claim 1, wherein axial impact surfaces (15*a*) provided on the outer radial collar (11) and counter impact surfaces (15*b*) provided on both inner radial flanks (14) of the impact ring (12) are provided, respectively, with chamfers having a same chamfer angle.

7. A hand-held percussion power tool according to claim 1, wherein a mass ratio of the impact ring (12) to the anvil (8) is equal to at least 0.25.

* * * * *